S. G. VAN DERBECK
ADJUSTABLE STEP PEDAL ATTACHMENT.
APPLICATION FILED AUG. 20, 1915.
1,214,619.
Patented Feb. 6, 1917.
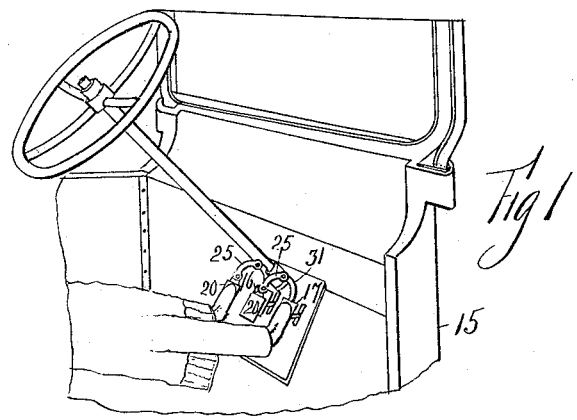
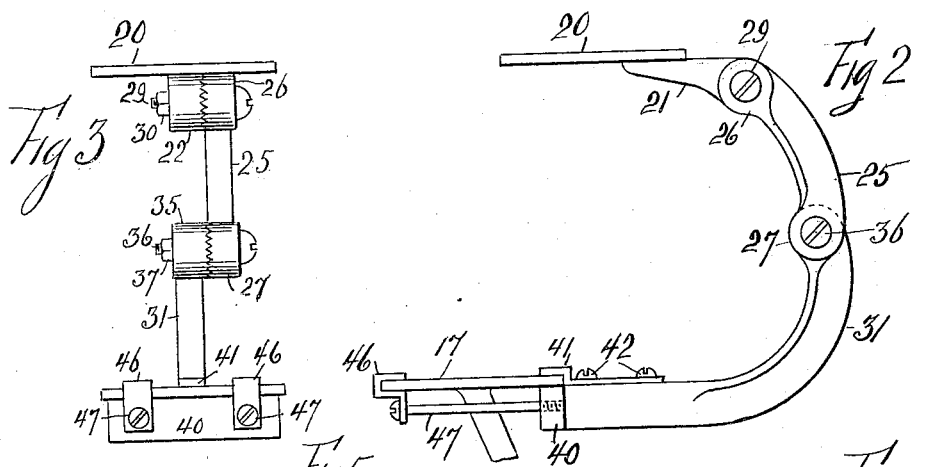
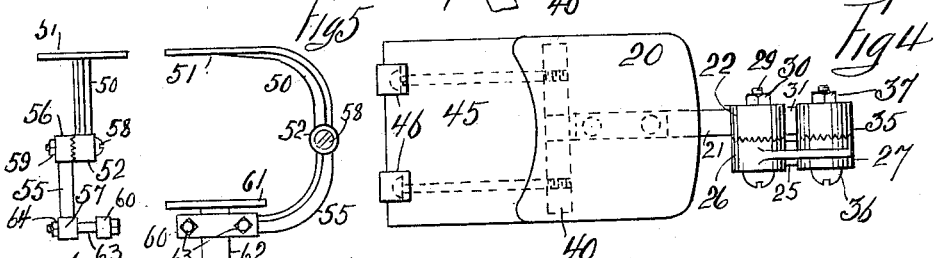
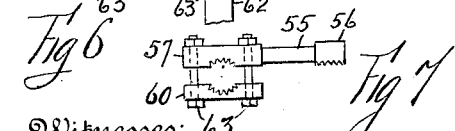
Inventor
Stephen G. Van Derbeck
By his Attorney

UNITED STATES PATENT OFFICE.

STEPHEN G. VAN DERBECK, OF HACKENSACK, NEW JERSEY, ASSIGNOR TO VAN DERBECK-SAYERS-MURDOCK CO., INC., A CORPORATION OF NEW YORK.

ADJUSTABLE-STEP PEDAL ATTACHMENT.

1,214,619.   Specification of Letters Patent.   Patented Feb. 6, 1917.

Application filed August 20, 1915. Serial No. 46,409.

*To all whom it may concern:*

Be it known that I, STEPHEN G. VAN DERBECK, a citizen of the United States, and a resident of Hackensack, in the county of Bergen and State of New Jersey, have invented certain new and useful Improvements in Adjustable-Step Pedal Attachments, of which the following is a specification.

This invention relates to an adjustable step pedal attachment. Its novelty comprises its adjustable features by means of which its step can be located at different levels, and means whereby it can be detachably connected to the single step pedals of motor vehicles, constituting with the ordinary single step pedal a double step pedal.

In the accompanying drawings Figure 1 shows a fragmentary perspective view of a motor vehicle with a pair of the inventions connected thereto, Fig. 2 represents a side elevation of the invention, Fig. 3 is a left hand side view of Fig. 2; Fig. 4 shows a top plan view of Fig. 2; Fig. 5 represents a side view of a modification of the invention; Fig. 6 shows a left hand side view of Fig. 5 and Fig. 7 represents a top view of a portion of Fig. 5.

Referring to Figs. 1 to 4 a fragmentary portion of a motor vehicle is indicated in its entirety by the numeral 15. Step pedals are shown at 16 and 17. The adjustable step pedal is shown to comprise the step 20 which has extending therefrom a bracket 21 with one member 22 of a ratchet coupling. A link is indicated at 25 with one member 26 of a ratchet coupling formed at one end thereof and a second member 27 of a ratchet coupling is formed at the other end of said link.

The members 22 and 26 are locked with each other by means of the screw 29, which is threaded in the member 22 and has the nut 30. A supporting arm 31 has formed at its upper end one member 35 of a ratchet coupling which is locked to the member 27 by means of the screw 36. The screw 36 is threaded in the member 35 and carries the nut 37. A cross member 40 is formed with the arm 31. A clamping bracket 41 is fastened to the arm 31 by means of the screws 42. A pair of adjustable clamping brackets 46 are supported on screws 47 that are threaded into the cross member 40. The step 17 is connected to the brackets 41 and 46, by virtue of which the arm 31 with its appurtenances are supported. The joint made by the clutch members 22 and 26 can be loosened to enable the step 20 to be clamped in different positions, that is to say, in different radial positions with respect to the longitudinal axis of the screw 29. The joint made by the clutch members 35 and 27 can be loosened so as to clamp the link 25 in different radial positions with respect to the longitudinal axis of the screw 36, and thereby raise or lower the step 20.

In Figs. 5, 6 and 7 the invention is modified to comprise the upper curved arm 50 with the pedal step 51 at its upper end and the ratchet clutch member 52 at its lower end. A lower curved member 55 has formed at its upper end the ratchet clutch member 56 and at its lower end is formed one member 57 of a ratchet clamping bracket. A screw 58 connects the members 52 and 56. The screw is threaded in the member 56 and carries the nut 59. An accompanying member of the ratchet clamping bracket is indicated at 60. The ordinary step 61 of a motor vehicle is shown with the shank 62, to which latter is clamped the said members of the ratchet clamping bracket by means of the screws 63. The latter are threaded in the member 57 and carry the nuts 64.

With this invention two adjustments can be made, one at the joint having the bolt 29 and one at the joint having the bolt 36, and by means of the said joints the step pedal 20 can be placed at different radial positions and at different distances from the step pedal like 17 of the motor vehicle 15.

The principal object of the invention is to permit a person with either short or long limbs to operate the step pedals of a motor vehicle, as indicated in Fig. 1 where a man is shown with his foot on the regular step pedal 17 of the vehicle and a lady with her foot on the step pedal 20 of the attachment.

Having described my invention what I desire to secure by Letters Patent and claim is:—

1. An adjustable step pedal attachment adapted to be connected to a vehicle pedal, comprising an arm having one member of a ratchet coupling thereon, clamping brackets adjustably connected to said arm to connect it to the regular step pedal of a motor vehicle, a link with one member of a ratchet coupling at its ends, one of the latter ratchet coupling members locking with the ratchet coupling member of said arm, and a bracket having formed at one end a step pedal and at the other end a member of a ratchet coupling, the latter locking with the other ratchet coupling of said link to locate the said step pedal at various angles.

2. An adjustable step pedal attachment adapted to be connected to a vehicle pedal, comprising an arm with one member of a ratchet coupling, adjustable clamping brackets to connect the arm to the regular step pedal of a motor vehicle, a link in the attachment with a member of a ratchet coupling at each end thereof, the ratchet coupling member of the arm adjustably connected to one of the ratchet coupling members of the link by means of a bolt and a step pedal in the attachment having a bracket with one member of a ratchet coupling, the latter adjustably connected to the other ratchet coupling member of said link by means of a bolt to locate the said step pedal at various angles and distances from the vehicle pedal.

Signed at the borough of Manhattan, in the county of New York and State of New York, this 18th day of August, A. D. 1915.

STEPHEN G. VAN DERBECK.

Witnesses:
A. A. DE BONNEVILLE,
DAVID J. HAVENSTRITE.

Copies of this patent may be obtained for five cents each, by addressing the "Commissioner of Patents, Washington, D. C."